US012781979B2

(12) United States Patent
Serle et al.

(10) Patent No.: US 12,781,979 B2
(45) Date of Patent: Nov. 3, 2026

(54) INTERCONNECTION OF LABORATORIES AND CLEANROOMS

(71) Applicant: GERMFREE LABORATORIES, LLC, Ormond Beach, FL (US)

(72) Inventors: Jeffrey Q. Serle, Flagler Beach, FL (US); Kevin Thomas Kyle, New Smyrna Beach, FL (US); Matthew Penny, Daytona Beach, FL (US); Brandon Serle, Daytona Beach, FL (US)

(73) Assignee: Germfree Laboratories LLC, Gainesville, FL (US)

( * ) Notice: Subject to any disclaimer, the term of this patent is extended or adjusted under 35 U.S.C. 154(b) by 368 days.

(21) Appl. No.: 18/575,969

(22) PCT Filed: Jul. 1, 2022

(86) PCT No.: PCT/US2022/035933
§ 371 (c)(1),
(2) Date: Jan. 2, 2024

(87) PCT Pub. No.: WO2023/278831
PCT Pub. Date: Jan. 5, 2023

(65) Prior Publication Data
US 2024/0240810 A1 Jul. 18, 2024

Related U.S. Application Data

(60) Provisional application No. 63/217,944, filed on Jul. 2, 2021.

(51) Int. Cl.
*F24F 3/167* (2021.01)
*B01L 1/02* (2006.01)

(52) U.S. Cl.
CPC ................ *F24F 3/167* (2021.01); *B01L 1/02* (2013.01); *B01L 2200/0689* (2013.01)

(58) Field of Classification Search
CPC .... F24F 3/167; B01L 2200/0689; B01L 1/02; B60P 3/14; E04B 1/34317
(Continued)

(56) References Cited

U.S. PATENT DOCUMENTS 2,247,340 A * 6/1941 Webster .................. E04B 1/348
52/79.8
5,562,539 A * 10/1996 Hashimoto ............ F24F 3/167
454/187
(Continued)

FOREIGN PATENT DOCUMENTS

JP H05106887 A 4/1993

OTHER PUBLICATIONS

International Search Report and Written Opinion issued in International Application No. PCT/US2022/035933, mailed Oct. 13, 2022, 13 pages.
(Continued)

*Primary Examiner* — Vivek K Shirsat
(74) *Attorney, Agent, or Firm* — Sean E. Combs, Esq.; GrayRobinson, P.A.

(57) ABSTRACT

An interconnection system for providing a sealed walkway between laboratories or cleanrooms includes a first connection seal configured to couple to a first mobile or modular unit and a second connection seal configured to couple to a second mobile or modular unit. The first and second connection seals provides an airtight connection between the first mobile or modular unit and the second mobile or modular unit. Each connection seal includes a channel for coupling to a mobile or modular unit and a gasket positioned within the channel. The gasket may include a stationary end
(Continued)

positioned within the channel and an expandable end that is expandable to make contact with an expandable end of another connection seal to provide the airtight connection between the mobile or modular units. The interconnection system may further include a connection bridge that couples to a gasket on each end to provide the airtight connection.

20 Claims, 10 Drawing Sheets

(58) Field of Classification Search
USPC ............................................ 454/187; 52/79.8
See application file for complete search history.

(56) References Cited

U.S. PATENT DOCUMENTS

| | | | | |
|---|---|---|---|---|
| 2001/0041530 | A1 | 11/2001 | Hara | |
| 2015/0101264 | A1 | 4/2015 | Jornitz | |
| 2019/0169811 | A1* | 6/2019 | DeLaine, Jr. | B61D 1/00 |

OTHER PUBLICATIONS

Terra Universal, "Modular Cleanrooms Pre-Tested Turnkey Systems," Jan. 1, 2006, 44 pages, vol. 10. No. 7, Terra Universal Mini-Catalogue.

* cited by examiner

INTERCONNECTION OF LABORATORIES AND CLEANROOMS

CROSS-REFERENCE TO RELATED APPLICATIONS

This application is the U.S. National Stage Application of International Application No. PCT/US22/35933, filed Jul. 1, 2022, which claims the benefit of U.S. Provisional Patent Application Ser. No. 63/217,944, filed Jul. 2, 2021, which are hereby incorporated by reference in their entirety.

BACKGROUND

There is a need for pharmaceutical laboratories and biohazard laboratory space. However, additional space for these laboratories may take years to build due to the complexity of the requirements for these laboratories. Furthermore, there may not be in close proximity to existing laboratory facilities to build new laboratory space. Therefore, mobile (e.g., towable) and modular (e.g., prefabricated and designed for permanent and/or semi-permanent placement) laboratories have become increasingly popular.

However, due to the limits set on the size of mobile and modular laboratory space (e.g., due to limitations in shipping size and other factors), a single mobile or modular laboratory does not provide the space required for all applications that are needed. Indeed, some processes do not allow products and/or raw materials to transfer into and out of a laboratory setting. Multiple mobile and/or modular laboratories can be used in some situations, however, this can create other issues, such as having to leave one mobile and/or modular laboratory to go to another mobile and/or modular laboratory, which requires changing personal protective equipment (PPE). Changing PPE every time a worker needs to go from one mobile and/or modular laboratory is time consuming, expensive, inefficient, and potentially hazardous to the process or environment. This also leads to the risk that workers in the mobile and/or modular laboratories will not change PPE every time they go from one mobile and/or modular laboratory to another. Entering and exiting between multiple mobile and/or modular laboratories that are not interconnected and sealed also poses significant risk of contamination to the processes, products, and personnel. Furthermore, even if workers correctly change PPE, having to change PPE multiple times per day creates an inefficient work environment.

BRIEF SUMMARY

Mobile and modular interconnection systems and methods are provided. Interconnection systems that provide airtight walkways for personnel and materials between mobile and/or modular laboratories allow for quick and virtually unlimited expansion of laboratory space without the normal downside that accompanies the use of multiple mobile and/or modular laboratories, such as the expense and time-consuming activity of having to change PPE when traveling to each mobile and/or modular laboratory and the risk of contamination to the processes, products, and personnel. Furthermore, the interconnection systems and methods described herein provide the ability to maintain and exceed current United States and European Union standards for cleanroom and biocontainment laboratories, including relevant requirements for HVAC, air filtration, and containment systems.

An interconnection system for providing a sealed walkway between laboratories or cleanrooms includes a first connection seal configured to couple to a first mobile or modular unit and a second connection seal configured to couple to a second mobile or modular unit. The first and second connection seals provide an airtight connection between the first mobile or modular unit and the second mobile or modular unit.

In some cases, the first connection seal includes a first channel for coupling to the first mobile or modular unit and a first gasket having a first stationary end positioned within the first channel and a first expandable end that is expandable to make contact with a second expandable end of a second gasket of the second connection seal to provide the airtight connection between the first mobile or modular unit and the second mobile or modular unit. In some cases, the second connection seal includes a second channel for coupling to the second mobile or modular unit and the second gasket having a second stationary end positioned within the second ceiling channel and the second expandable end that is expandable to make contact with the first expandable end of the first gasket of the first connection seal to provide the airtight connection between first mobile or modular unit and the second mobile or modular unit. In some cases, the first channel and the second channel is a U-channel or a C-channel.

In some cases, the first connection seal includes a first channel for coupling to the first mobile or modular unit and a first gasket positioned within the first channel. In some cases, the second connection seal includes a second channel for coupling to the second mobile or modular unit and a second gasket positioned within the second channel. In some cases, the interconnection system further includes a connection bridge. The connection bridge includes a first end configured to couple to the first gasket of the first connection seal and a second end configured to couple to the second gasket of the second connection seal. The connection bridge provides an airtight connection between the first and second connection seals. In some cases, the first channel and the second channel is a J-channel.

In some cases, the interconnection system further includes an air blower system. In some cases, the air blower system includes an air inlet formed within a wall, a ceiling, or a floor of the interconnection system, a housing fluidically coupled to the air inlet, an air outlet formed within the wall, the ceiling, or the floor of the interconnection system and fluidically coupled to the housing, and a blower motor mounted within the housing. When the blower motor is in operation, the blower motor generates an air flow from the air inlet, through the housing, and out of the air outlet. In some cases, the air blower system further includes an air filter mounted within the housing. In some cases, the air blower system is configured to provide a unidirectional laminar flow of air within the interconnection system. In some cases, the air blower system is configured to provide positive air pressure to the interconnection system. In some cases, the air blower system is configured to provide negative air pressure to the interconnection system.

In some cases, the interconnection system further includes an air inlet configured to supply treated air from the first mobile or modular unit or the second mobile or modular unit and an air outlet configured to remove air from the interconnection system (e.g., the interconnection system does not include the air blower system).

In some cases, the interconnection system further includes one or more leveling jacks underneath one or more portions of the interconnection system for adjusting a height of the one or more portions of the interconnection system.

A method of connecting a plurality of mobile or modular units includes coupling a first interconnection system to a first mobile or modular unit and coupling the first interconnection system to the second mobile or modular unit. In some cases, coupling the first interconnection system to the first mobile or modular unit includes coupling the first connection seal of the first interconnection system to a door frame of the first mobile or modular unit. In some cases, coupling the first interconnection system to the second mobile or modular unit includes coupling the second connection seal of the first interconnection system to a door frame of the second mobile or modular unit. In some cases, the method further includes coupling a second interconnection system to the second mobile or modular unit and coupling the second interconnection system to the third mobile or modular unit.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Mobile and modular interconnection systems and methods are provided. Interconnection systems that provide airtight walkways for personnel and materials between mobile and/or modular laboratories allow for quick and virtually unlimited expansion of laboratory space without the normal downside that accompanies the use of multiple mobile and/or modular laboratories, such as the expense and time-consuming activity of having to change PPE when traveling to each mobile and/or modular laboratory and the risk of contamination to the processes, products, and personnel. Furthermore, the interconnection systems and methods described herein provide the ability to maintain and exceed current United States and European Union standards for cleanroom and biocontainment laboratories, including relevant requirements for HVAC, air filtration, and containment systems.

As used herein, the term "laboratory," "cleanroom" and "unit" are used interchangeably and refer to buildings that require some control of air flow, air pressure, and/or air filtering.

Figure 1A:
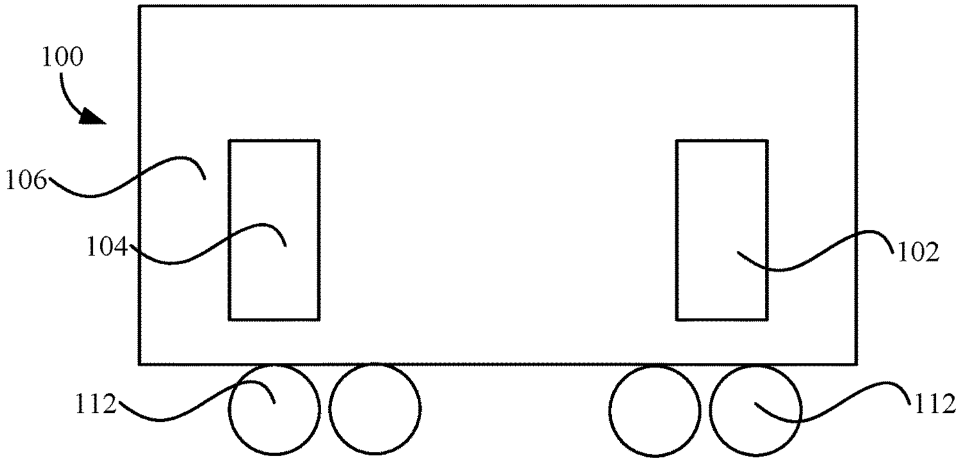
FIGS. 1A and 1B illustrate a mobile laboratory.
Figure 1B:
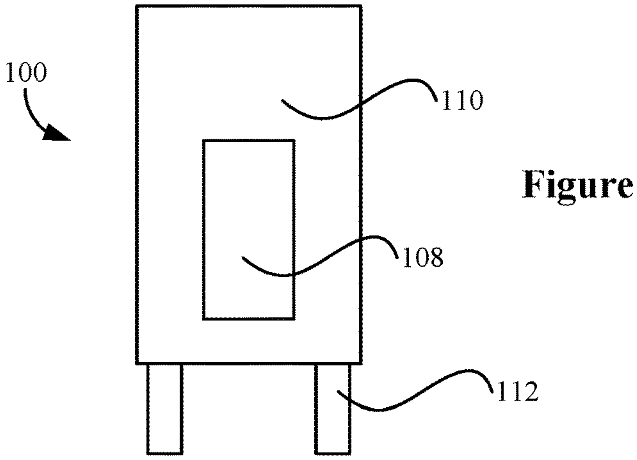

FIGS. 1A and 1B illustrate a mobile laboratory. FIG. 1A illustrates a side of a mobile laboratory. FIG. 1B illustrates a rear of a mobile laboratory. Referring to FIGS. 1A and 1B, a mobile laboratory 100 includes two doorways 102, 104 on a side 106 and a doorway 108 on a rear 110 of the mobile laboratory 100. The mobile laboratory 100 is towed via wheels 112 attached to a frame of the mobile laboratory 100. It should be understood that a mobile or modular laboratory may include more or less doors than are illustrated in FIGS. 1A and 1B, which are merely used here as an example configuration of doorways in a mobile or modular laboratory. Currently, in order for a worker to travel between two different mobile and/or modular laboratories, the worker must exit one of the doorways 102, 104, 108 of the first mobile laboratory, take off their PPE, enter a PPE changing room in a second mobile or modular laboratory, put on new PPE, and finally enter the workspace in the second mobile or modular laboratory. Therefore, not only does the worker use precious time putting on PPE and produce excess waste (e.g., the used PPE from the first mobile laboratory 100), there is a significant risk of contamination to the processes, products, and personnel and precious space is consumed by the PPE changing room in every mobile and/or modular laboratory.

Figure 2A:
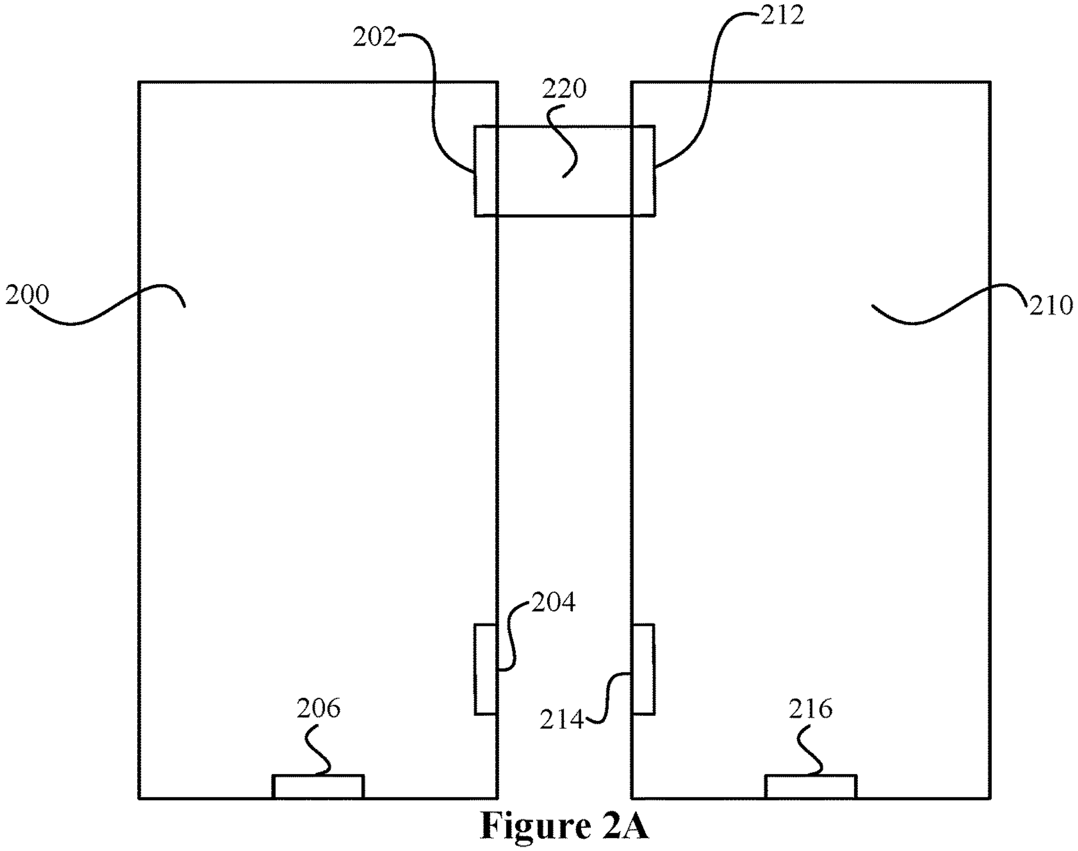
FIG. 2A illustrates an interconnection system connecting two mobile laboratories.

FIG. 2A illustrates an interconnection system connecting two mobile laboratories. Referring to FIG. 2A, a first mobile or modular laboratory 200 is connected to a second mobile or modular laboratory 210 via an interconnection system 220. In this example, the interconnection system 220 connects the first and second mobile or modular laboratories 200, 210 from a front-side doorway 202, 212 (e.g., doorway 102 of FIG. 1A) of each of the mobile or modular laboratories 200, 210, however, the interconnection system 220 may be used to connect the first and second mobile or modular laboratories 200, 210 from a rear-side doorway 204, 214 (e.g., doorway 104 of FIG. 1A) of each of the mobile or modular laboratories 200, 210, a rear doorway 206, 216 (e.g., doorway 108 of FIG. 1B), or any other door a mobile or modular laboratory may include.

Figure 2B:
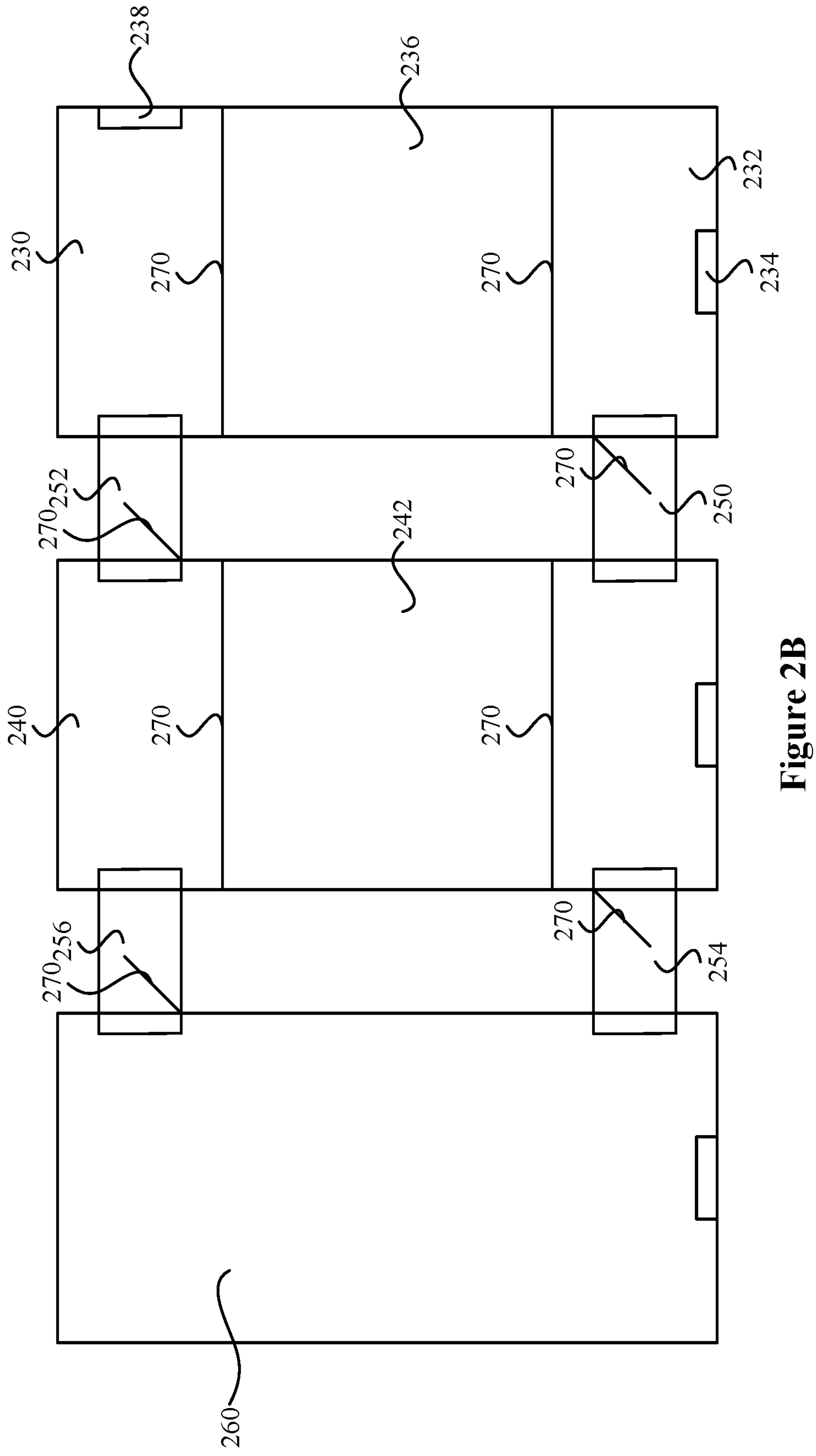
FIG. 2B illustrates a plurality of interconnection systems connecting a plurality of mobile laboratories.

FIG. 2B illustrates a plurality of interconnection systems connecting a plurality of mobile laboratories. Although the plurality of interconnection systems connecting a plurality of mobile laboratories illustrated in FIG. 2B is described below as providing unidirectional flow of personnel and materials in a laboratory environment, it should be understood that bidirectional flow of personnel and materials may also be provided. Indeed, the plurality of interconnection systems connecting a plurality of mobile and/or modular laboratories provides the ability to implement unidirectional flow of personnel and materials in a laboratory environment in situations in which that is advantageous (e.g., pharmaceutical manufacturing), however, if that functionality is not desired, bidirectional flow of people and/or materials can be utilized.

Referring to FIG. 2B, a first mobile or modular laboratory 230 is connected to a second mobile laboratory 240 via two interconnection systems 250, 252. The second mobile laboratory is further connected to a third mobile laboratory 260 via two interconnection systems 254, 256. By providing a plurality of interconnection systems 250, 252, 254, 256 connecting a plurality of mobile or modular laboratories 230, 240, 260, personnel (e.g., workers) and materials can be moved through the mobile or modular laboratories 230, 240, 260 in a single direction, which can be essential for some processes, including biopharmaceutical bioprocessing.

For example, a worker can enter a PPE changing room 232 of the first mobile or modular laboratory 230 via the rear doorway 234. After donning the proper PPE, the worker can move to a workspace 236 of the first mobile or modular laboratory 230 or move to the second mobile or modular laboratory 240. If the worker moves to the workspace 236 of the first mobile or modular laboratory 230, the worker can then exit the first mobile or modular laboratory 230 (e.g., once finished working) via the exit doorway 238.

If the worker moves to the second mobile or modular laboratory 240 (e.g., via the first interconnection system 250), the worker can move to a workspace 242 of the second mobile or modular laboratory 230 or move to the third mobile or modular laboratory 260 via the third interconnection system 254. If the worker moves to the workspace 242 of the second mobile or modular laboratory 240, the worker can exit the second mobile or modular laboratory 240 (e.g., once finished working) by traveling through the second interconnection system 252, through the first mobile or modular laboratory 230, and out the exit doorway 238 of the first mobile or modular laboratory 230.

If the worker moves to the third mobile or modular laboratory 260, once finished working, the worker can exit the third mobile or modular laboratory 260 via the fourth interconnection system 256, travel through the second mobile or modular laboratory 240 and enter the first mobile or modular laboratory 230 via the second interconnection system 252, and exit the first mobile or modular laboratory 230 via the exit doorway 238. In some cases, one-way barriers 270 can be installed to ensure one-way movement of personnel and materials. In this way, cross-contamination of personnel and materials is minimized.

Figure 3A:
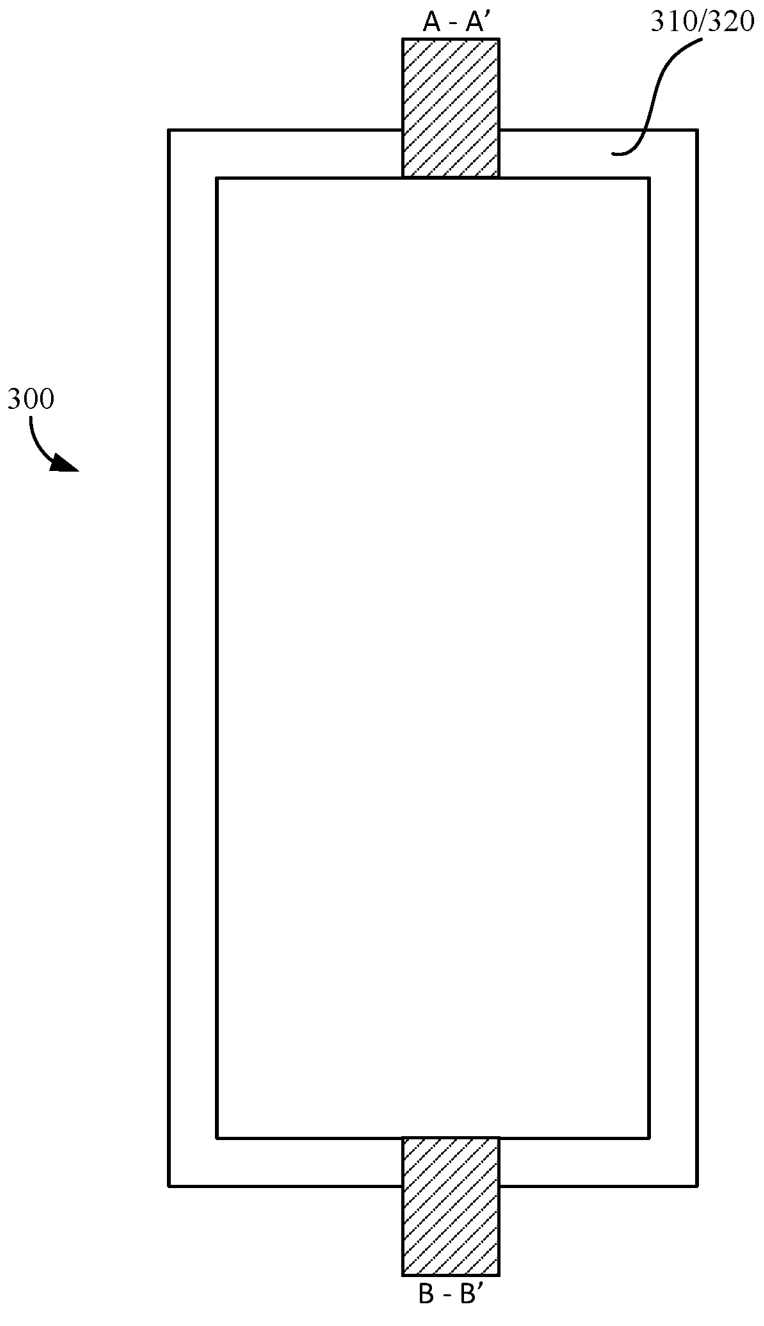
FIGS. 3A-3C illustrate views of an interconnection system connecting two door frames of mobile or modular laboratories.
Figure 3B:
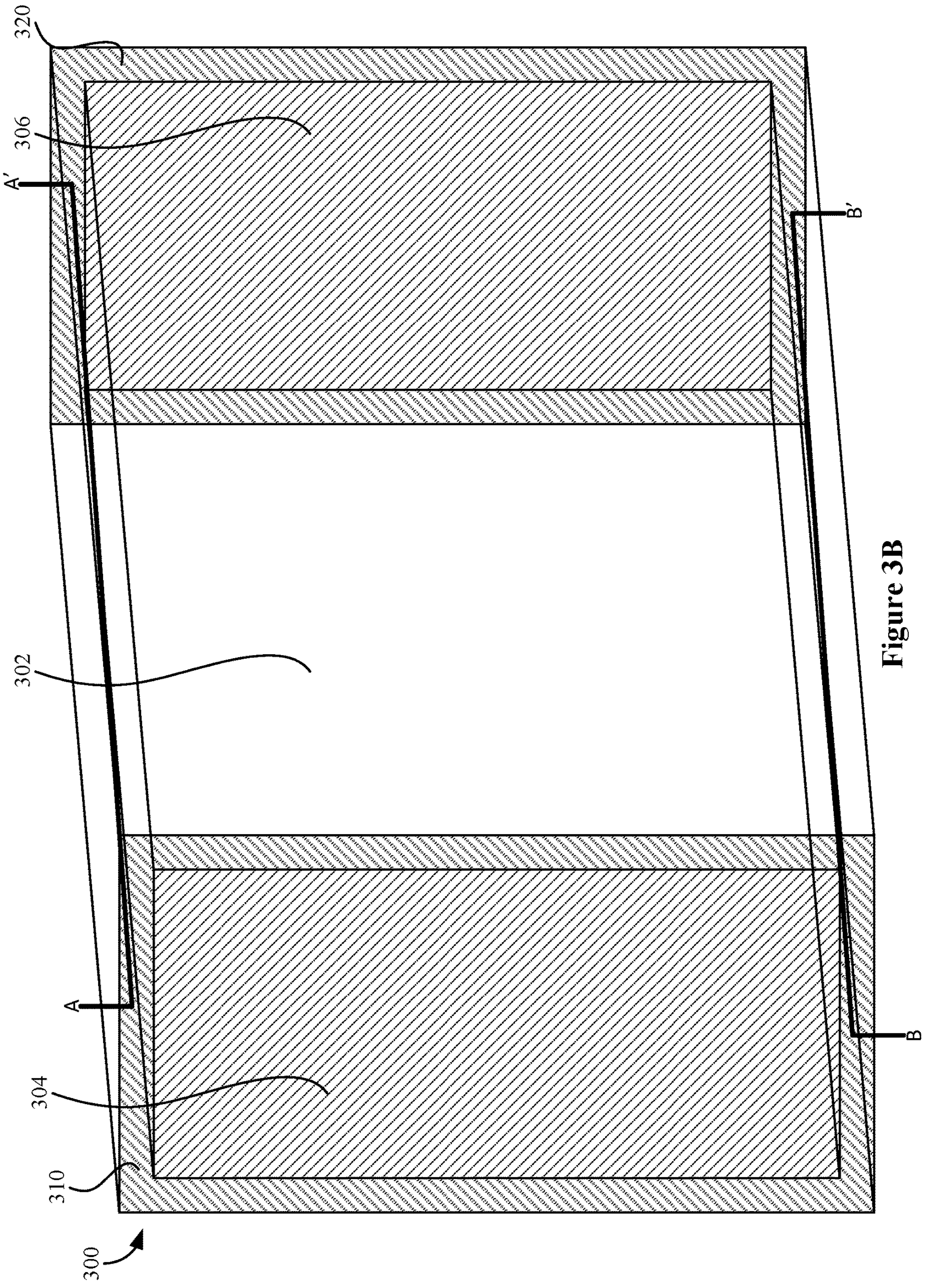
Figure 3C:
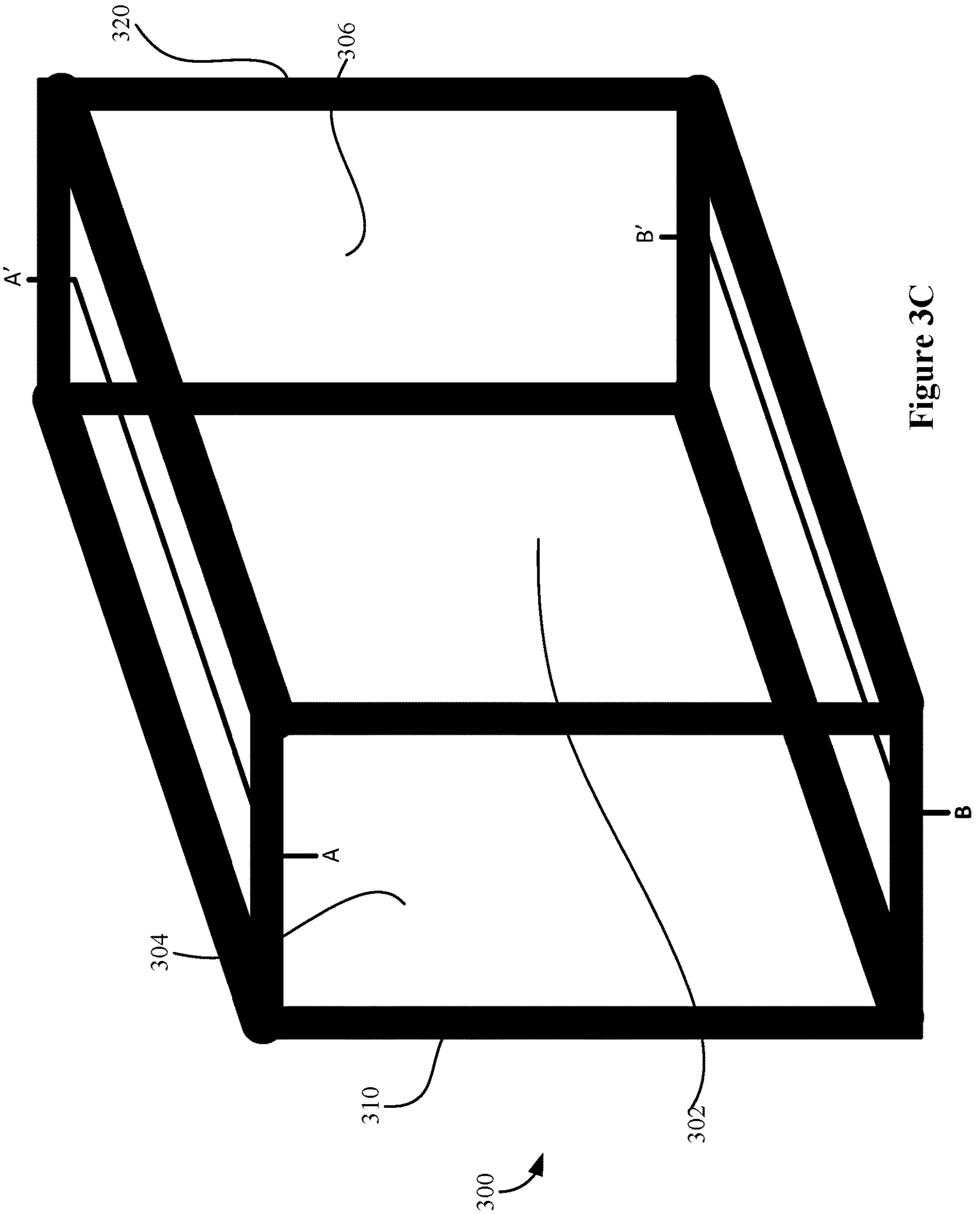
Figure 4A:
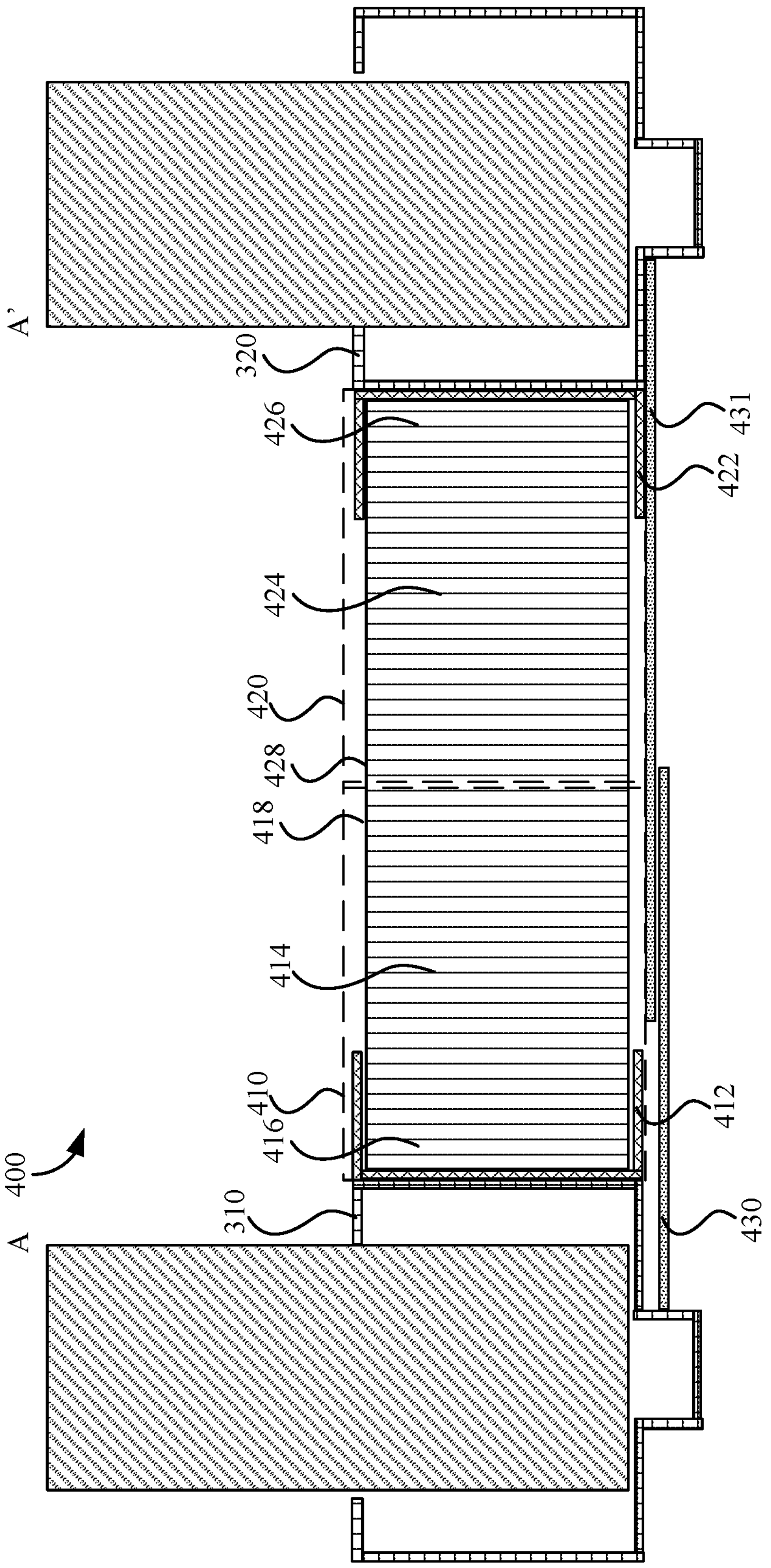
FIGS. 4A and 4B illustrate cut-away views of an expandable interconnection system connecting two door frames of mobile or modular laboratories.
Figure 4B:
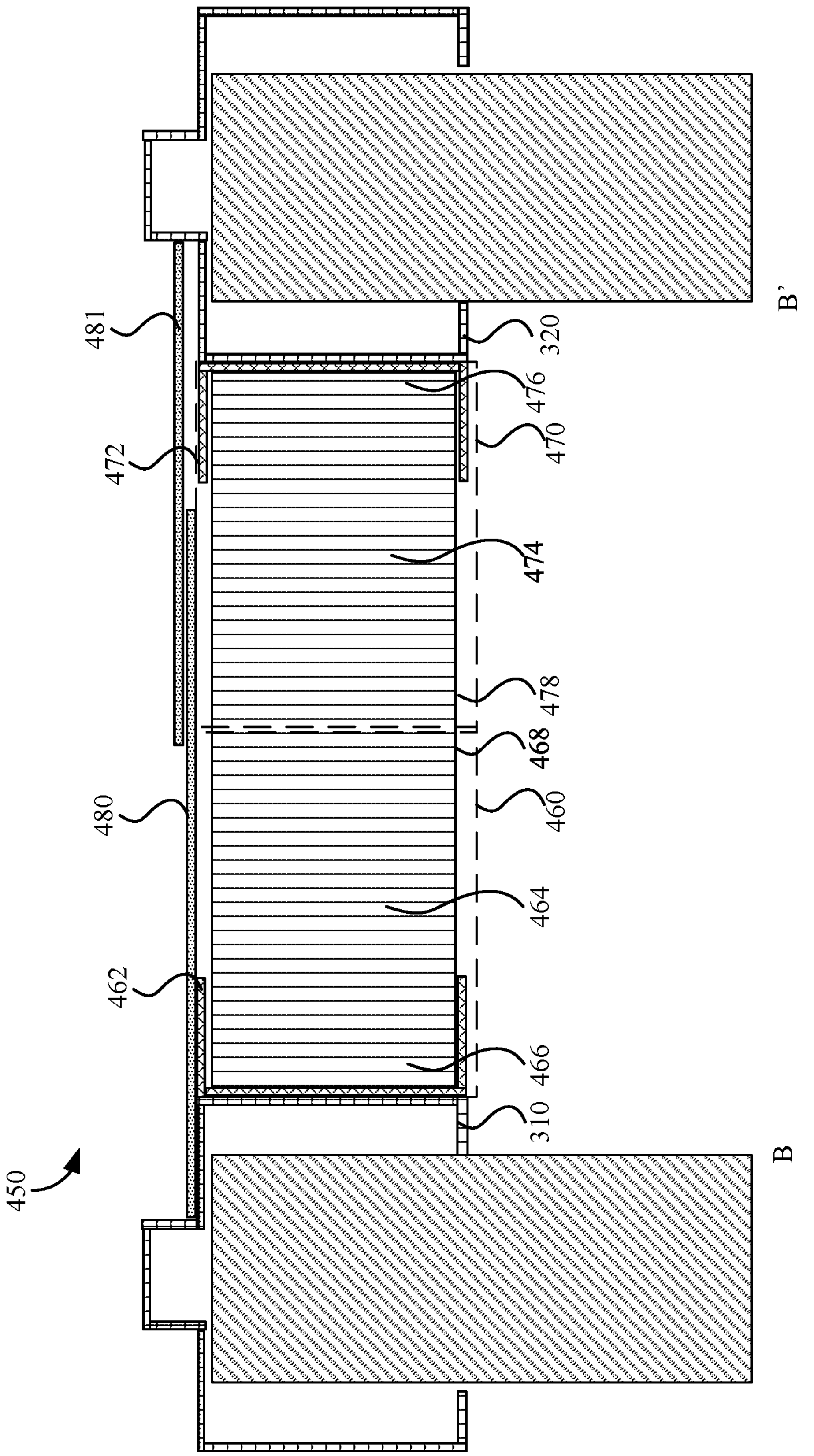
Figure 5A:
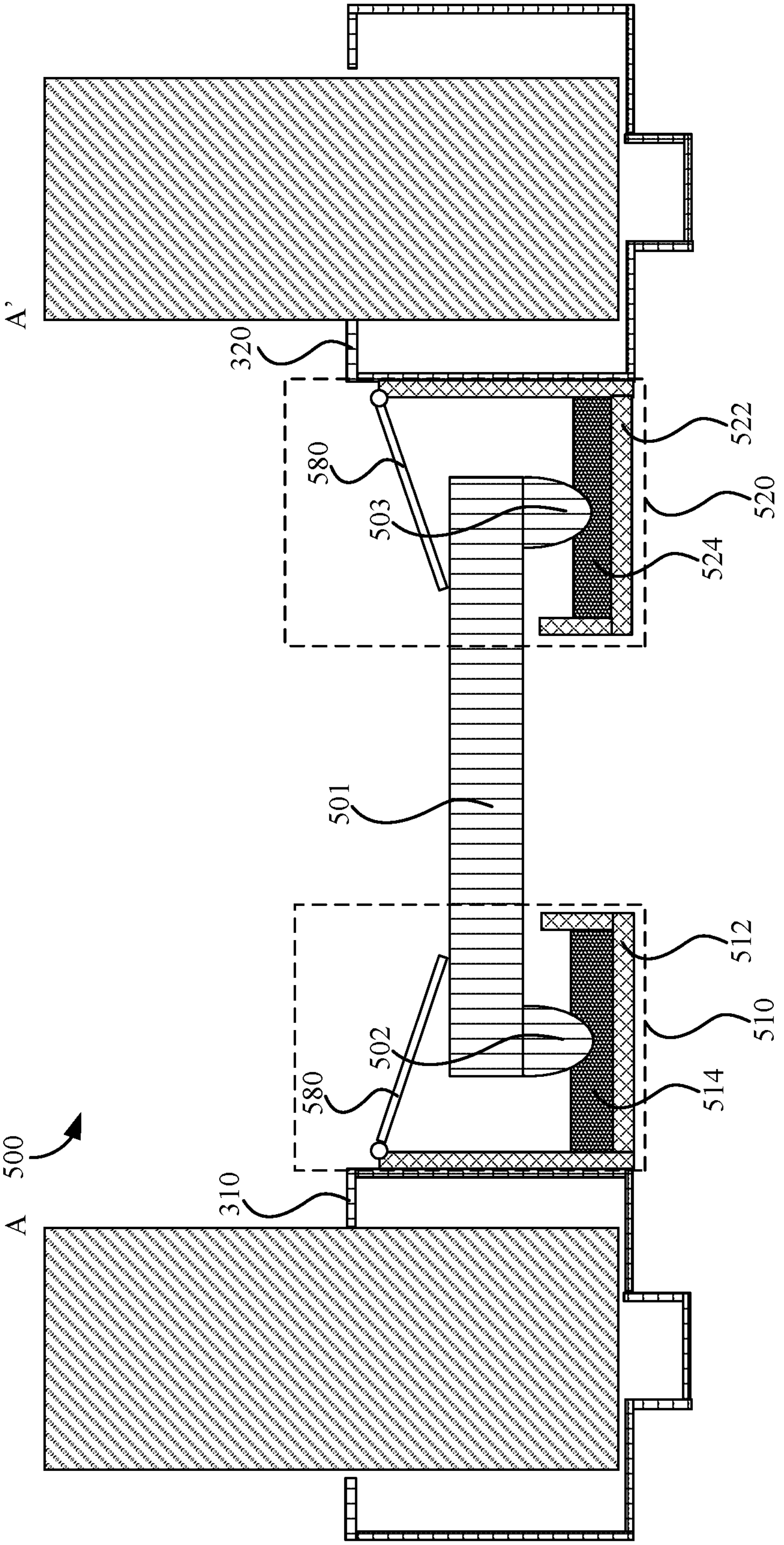
FIGS. 5A and 5B illustrate cut-away views of an adaptable interconnection system connecting two door frames of mobile or modular laboratories.
Figure 5B:
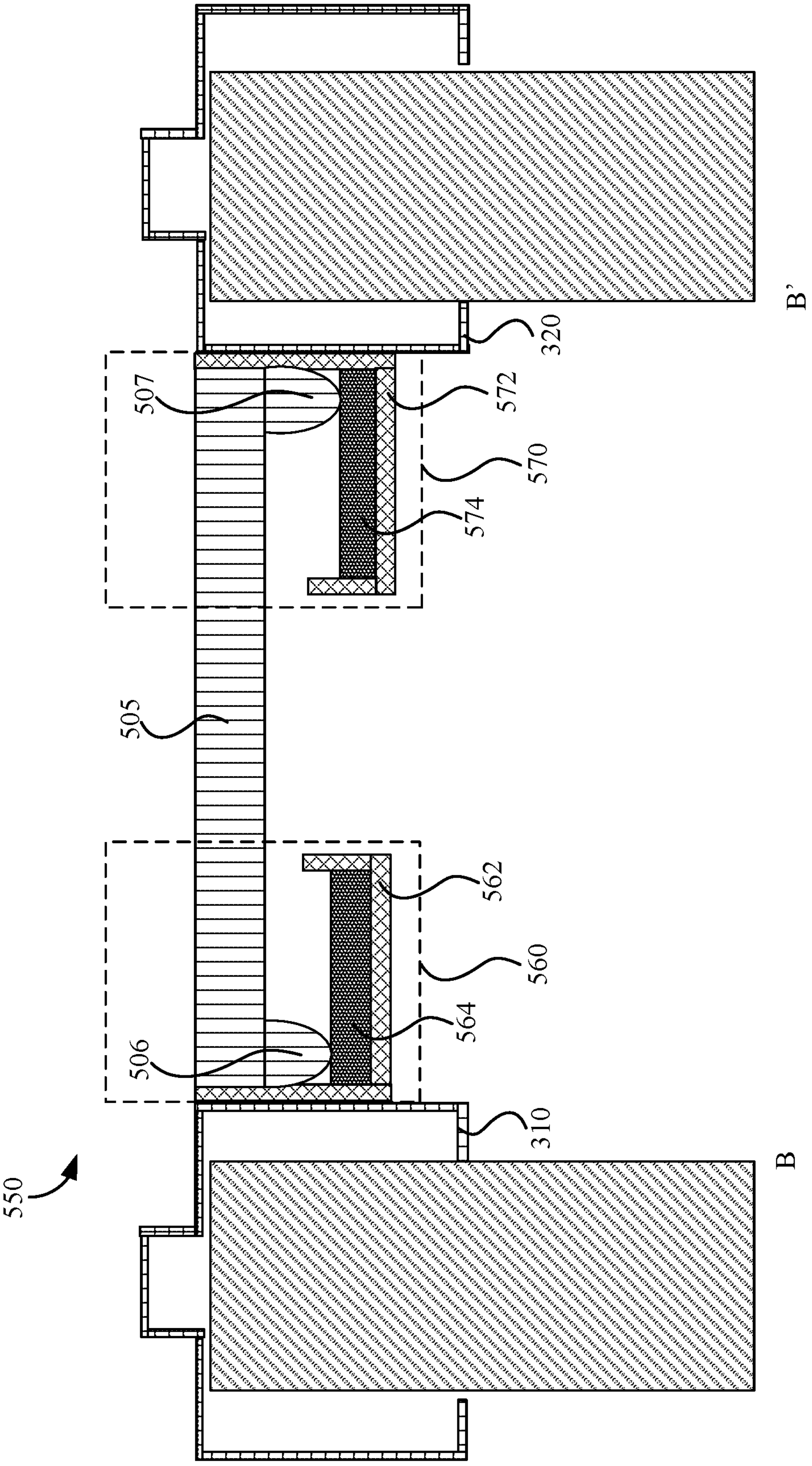

Turning to the details of an interconnection system. FIGS. 3A-3C illustrate views of an interconnection system connecting two door frames of mobile or modular laboratories. Specifically. FIG. 3A illustrates a front view of an interconnection system 300 attached to doorways 310, 320 of mobile and/or modular laboratories. FIG. 3B illustrates a perspective view of an interconnection system 300 attached to doorways 310, 320 of mobile and/or modular laboratories. FIG. 3C illustrates another perspective view of an interconnection system 300 attached to doorways 310, 320 of mobile and/or modular laboratories. The interconnection system 300 includes a walkway 302 having a first end 304 and a second end 306. FIGS. 3A-3C each also include "A" and "A" and "B" and "B", which are used to denote cutaway drawings in FIGS. 4A, 4B, 5A, and 5B. Specifically. FIGS. 4A and 5A illustrate embodiments of a cutaway of A-A' (e.g., a cutaway of a ceiling portion of an interconnection system) and FIGS. 4B and 5B illustrate embodiments of a cutaway of B-B' (e.g., a cutaway of a floor portion of an interconnection system). It should be understood that the embodiments illustrated in FIGS. 4A-5B illustrate airtight portions of the interconnection system and that the walkway 302 may include more materials than are illustrated in FIGS. 4A-5B, such as materials that are used for aesthetic, cleanroom, and/or laboratory purposes (e.g., ease of cleaning).

FIGS. 4A and 4B illustrate cut-away views of an expandable interconnection system connecting two door frames of mobile or modular laboratories. Referring to FIG. 4A, a ceiling portion 400 of an interconnection system includes a first ceiling connection seal 410 for coupling to a top/ceiling of a doorway 310 of the first mobile or modular unit. The ceiling portion 400 of the interconnection system further includes a second ceiling connection seal 420 for coupling to a top/ceiling of the doorway 320 of the second mobile or modular unit. The first and second ceiling connection seals 410, 420 provide an airtight connection between the top/ceiling of the doorway 310 of the first mobile or modular unit the top/ceiling of the doorway 320 of the second mobile or modular unit.

Referring to FIG. 4B, a floor portion 450 of an interconnection system includes a first floor connection seal 460 for coupling to a bottom/floor of the doorway 310 of the first mobile or modular unit. The floor portion 450 of the interconnection system further includes a second floor connection seal 470 for coupling to a bottom/floor of the doorway 320 of a second mobile or modular unit. The first and second floor connection seals 460, 470 provides an airtight connection between the bottom/floor of the doorway 310 of the first mobile or modular unit and the bottom/floor of the doorway 320 of the second mobile or modular unit.

While FIGS. 4A and 4B illustrate portions 400, 450 of an interconnection system, when combined together (along with side/wall portions, which may include similar features as the top and bottom portions 400, 450 so as to create airtight connections between the sides/walls of the interconnection system and the sides/walls of the mobile and/or modular units), these portions create an airtight shell of a walkway (e.g., walkway 302 of FIGS. 3A-3C) having an first end (e.g., first end 304 of FIGS. 3A-3C) and a second end (e.g., second end 306 of FIGS. 3A-3C). In some cases, the combination of the portions 400, 450 (as well as side/wall portions) of the interconnection system results in an interconnection system that is cuboidal, cylindrical (e.g., with the floor, side/wall, and ceiling portions replaced with a single annular portion), or in the shape of a triangular prism (e.g., with the ceiling and side/wall portions replaced with two 45 degree side portions).

Referring to FIGS. 4A and 4B, the first connection seal (e.g., the combination of first ceiling connection seal 410, first floor connection seal 460, and the side portions discussed above) includes a first channel 412, 462 for coupling to the doorway 310 of the first mobile or modular unit and a first gasket 414, 464. The first gasket 414, 464 includes a first stationary end 416, 466 positioned within the first channel 412, 462 and a first expandable end 418, 468 that is expandable to make contact with a second expandable end 428, 478 of a second gasket 424, 474 of a second connection seal. The second connection seal (e.g., the combination of the second ceiling connection seal 420, second floor connection seal 470, and the side portions discussed above) includes a second channel 422, 472 for coupling to the doorway 320 of the second mobile or modular unit and a second gasket 424, 474. The second gasket 424, 474 includes a second stationary end 426, 476 positioned within the second channel 422, 472 and a second expandable end 428, 478 that is expandable to make contact with the first expandable end 418, 468 of the first gasket 414, 464 of the first connection seal. The contact of the first expandable end 418, 468 of the first gasket 414, 464 with the second expandable end 428, 478 of the second gasket 424, 474 creates an airtight connection between the first connection seal and the second connection seal.

The positioning of the stationary end 416, 466 of the first gasket 414, 464 within the first channel 412, 462 creates an airtight connection between the first gasket 414, 464 and the first channel 412, 462, the positioning of the stationary end 426, 476 of the second gasket 424, 474 within the second channel 422, 472 creates an airtight connection between the second gasket 424, 474 and the second channel 422, 472. With both the first and second gaskets 414, 424, 464, 474 having expandable ends 418, 428, 468, 478, the interconnection system provides an airtight connection with many variations in sizes and heights between the first and second mobile and/or modular units.

In some cases, the first and second gaskets 414, 424, 464, 474 (along with side/wall portion gaskets) are monolithic. In other words, the first gasket 414, 464. (along with side/wall portions of the gasket) are a single gasket made from a single piece of material, and the second gasket 424, 474 (along with side/wall portions of the gasket) are a single gasket made from a single piece of material. In some cases, each portion of a gasket (e.g., the first ceiling gasket 414, the first floor gasket 464, and side/wall portions of the first gasket) are not monolithic and are coupled together during installation of the interconnection system. In some cases, the first and second channels 412, 422, 462, 472 (along with side/wall portion channels) are monolithic. In other words, the first channel 412, 462 (along with side/wall portions of the channel) are a made from a single piece of material and the second channel 422, 472 (along with side/wall portions of the channel) are made from a single piece of material. In some cases, each portion (e.g., the first ceiling channel 422, the first floor channel 472, and side/wall portions of the first channel) are not monolithic and are coupled together during installation of the interconnection system.

In some cases, the first channel 412, 462 (and the side/wall portions of the first channel) is a U-channel or a C-channel. In some cases, the first channel 412, 462 (and the side/wall portions of the first channel) is welded onto the doorway 310 of the first mobile or modular unit to create an airtight connection between the first channel and the doorway 310 of the first mobile or modular unit. In some cases, the first channel 412, 462 (and the side/wall portions of the first channel) is attached with adhesive to the doorway 310 of the first mobile or modular unit to create an airtight connection between the first channel and the doorway 310 of the first mobile or modular unit. In some cases, the first channel 412, 462 (and the side/wall portions of the first channel) is attached via nails and/or screws to the doorway 310 of the first mobile or modular unit to create an airtight connection between the first channel and the doorway 310 of the first mobile or modular unit. In some of these cases, additional materials (e.g., weatherstripping, liquid drywall. Gorilla R: Glue, or the like) are used to reinforce the airtight connection between the first channel 412, 462 (and the side/wall portions of the first channel) and the doorway 310 of the first mobile or modular unit.

In some cases, the second channel 422, 472 (and the side/wall portions of the second channel) is welded onto the doorway 320 of the second mobile or modular unit to create an airtight connection between the second channel and the doorway 320 of the second mobile or modular unit. In some cases, the second channel 422, 472 (and the side/wall portions of the second channel) is attached with adhesive to the doorway 320 of the second mobile or modular unit to create an airtight connection between the second channel and the doorway 320 of the second mobile or modular unit. In some cases, the second channel 422, 472 (and the side/wall portions of the second channel) is attached via nails and/or screws to the doorway 320 of the second mobile or modular unit to create an airtight connection between the second channel and the doorway 320 of the second mobile or modular unit. In some of these cases, additional materials (e.g., weatherstripping, liquid drywall. Gorilla R Glue, or the like) are used to reinforce the airtight connection between the second channel 422, 472 and the second mobile or modular unit.

In some cases, the ceiling connection seals 410, 420 are covered by ceiling trim plates 430, 431 for aesthetic purposes. In some cases, the ceiling trim plates 430, 431 are overlapping one another. In some cases, the ceiling trim plates 430, 431 are (horizontally) flush against one another. In some cases, the floor connection seals 460, 470 are covered by flooring trim plates 480, 481 for aesthetic purposes. In some cases, the flooring trim plates 480, 481 are overlapping one another. In some cases, the flooring trim plates 480, 481 are (horizontally) flush against one another. In some cases, the ceiling trim plates 430, 431 provides additional hermetic sealing of the interconnection system.

FIGS. 5A and 5B illustrate cut-away views of an adaptable interconnection system connecting two door frames of mobile or modular laboratories. Referring to FIG. 5A, a ceiling portion 500 of an interconnection system includes a first ceiling connection seal 510 for coupling to a top/ceiling of a doorway 310 of the first mobile or modular unit. The ceiling portion 500 of the interconnection system further includes a second ceiling connection seal 520 for coupling to a top/ceiling of a doorway 320 of the second mobile or modular unit. The ceiling portion 500 of the interconnection system further includes a ceiling connection bridge 501 having a first end 502 coupled to the first ceiling connection seal 510 and a second end 503 coupled to the second ceiling connection seal 520. The first and second ceiling connection seals 510, 520 and the ceiling connection bridge 501 provide an airtight connection between the top/ceiling of the doorway 310 of the first mobile or modular unit and the top/ceiling of the doorway 320 of the second mobile or modular unit.

Referring to FIG. 5B, a floor portion 550 of an interconnection system includes a first floor connection seal 560 for coupling to a bottom/floor of the doorway 310 the first mobile or modular unit. The floor portion 550 of the interconnection system further includes a second floor connection seal 570 for coupling to a bottom/floor of the doorway 320 of the second mobile or modular unit. The ceiling portion 500 of the interconnection system further includes a floor connection bridge 505 having a first end 506 coupled to the first floor connection seal 560 and a second end 507 coupled to the second floor connection seal 570. The first and second floor connection seals 560, 570 and the floor connection bridge 505 provide an airtight connection between the bottom/floor of the doorway 310 of the first mobile or modular unit and the bottom/floor of the doorway 320 of the second mobile or modular unit.

While FIGS. 5A and 5B illustrate portions 500, 550 of an interconnection system, when combined together (along with side/wall portions, which may include similar features as the ceiling and floor portions 500, 550 so as to create airtight connections between the sides/walls of the interconnection system and the sides/walls of the mobile and/or modular units), these portions create an airtight shell of a walkway (e.g., walkway 302 of FIGS. 3A-3C) having a first end (e.g., first end 304 of FIGS. 3A-3C) and a second end (e.g., second end 306 of FIGS. 3A-3C). In some cases, the combinations of the portions 500, 550 (as well as side/wall portions) of the interconnection system results in an interconnection system that is cuboidal, cylindrical (e.g., with the floor, side, and ceiling portions replaced with a single annular portion), or in the shape of a triangular prism (e.g., with the ceiling and side portions replaced with two 45-degree side portions).

Referring to FIGS. 5A and 5B, the first connection seal (e.g., the combination of first ceiling connection seal 510, first floor connection seal 560, and the side/wall portions discussed above) includes a first channel 512, 562 for coupling to the doorway 310 of the first mobile or modular unit and a first gasket 514, 564 positioned within the first channel 512, 562. The first interconnection system (e.g., ceiling and floor portions 500, 550 and side/wall portions) further includes the connection bridge 501, 505 (and corresponding side/wall portions). The first end 502, 506 of the connection bridge 501, 505 is coupled to the first gasket 514, 564 of the first connection seal 510, 560. In some cases, the coupling of the first end 502, 506 of the connection bridge 501, 505 to the first gasket 514, 564 of the first connection seal 510, 560 is done by placing the first end 502, 506 of the connection bridge 501, 505 on top of the first gasket 514, 564 (e.g., via gravity). In some cases, coupling of the first end 502, 506 of the connection bridge 501, 505 to the first gasket 514, 564 of the first connection seal 510, 560 is reinforced by sealing that connection using materials and methods known to those skilled in the art of airtight connections (e.g., adhesives, sealant materials, and the like). In some cases, the first end 502, 506 of the connection bridge 501, 505 is rounded for adjustability in making contact with the first gasket 514, 564.

In some cases, the second connection seal (e.g., the combination of second ceiling connection seal 520, second floor connection seal 570, and the side/wall portions discussed above) includes a second channel 522, 572 for coupling to the doorway 320 of the second mobile or modular unit and a second gasket 524, 574 positioned within the second channel 522, 572. The second end 503, 507 of the connection bridge 501, 505 is coupled to the second gasket 524, 574 of the second connection seal 520, 570. In some cases, the coupling of the second end 503, 507 of the connection bridge 501, 505 to the second gasket 524, 574 of the second connection seal 520, 570 is done by placing the second end 503, 507 of the connection bridge 501, 505 on top of the second gasket 524, 574 (e.g., via gravity). In some cases, coupling of the second end 503, 507 of the connection bridge 501, 505 to the second gasket 524, 574 of the second connection seal 520, 570 is reinforced by sealing that connection using materials and methods known to those skilled in the art of airtight connections (e.g., adhesives, sealant materials, and the like). In some cases, the second end 503, 507 of the connection bridge 501, 505 is rounded for adjustability in making contact with the second gasket 524, 574. In any case, the connection bridge 501, 505 provides an airtight connection between the first and second connection seals 510, 520, 560, 570.

In some cases, the first and second gaskets 514, 524, 564, 574 (along with the side/wall portion gaskets) are monolithic. In some cases, the first and second gaskets 514, 524, 564, 574 (along with the side/wall portion gaskets) are not monolithic and are coupled together during installation of the interconnection system. In some cases, the first and second channels 512, 522, 562, 572 (along with side/wall portion gaskets) are monolithic. In some cases, the first and second channels 512, 522, 562, 572 (along with side/wall portion gaskets) are not monolithic and are coupled together during installation of the interconnection system.

In some cases, the first channel 512, 562 (and the side/wall portions of the first channel) is a J-channel. In some cases, the second channel 522, 572 (and the side/wall portions of the second channel) is a J-channel. In some cases, the first channel 512, 562 and/or the second channel 522, 572 (and their respective side/wall portions) are welded onto the doorway 310, 320 of the mobile or modular unit to create an airtight connection. In some cases, the first channel 512, 562 and/or the second channel 522, 572 (and their respective side/wall portions) are attached with adhesive to the doorway 310, 320 of the mobile or modular unit to create an airtight connection. In some cases, the first channel 512, 562 and/or the second channel 522, 572 (and their respective side/wall portions) are attached via nails and/or screws to the doorway 310, 320 of the mobile or modular unit to create an airtight connection. In some of these cases, additional materials (e.g., weatherstripping, liquid drywall. Gorilla R Glue, or the like) are used to reinforce the airtight connection between the first channel 512, 562 and/or the second channel 522, 572 and the mobile or modular unit. In some cases, rain guards 580 can be installed to protect the first and second ceiling gaskets 514, 524.

In some cases, an interconnection system (e.g., any interconnection system described herein), includes an air inlet and/or an air outlet formed within a wall, a ceiling, or a floor of the interconnection system. In some cases, the air inlet and/or air outlet is coupled to an existing air blower system/fan filter unit of one or more mobile or modular units (e.g., the interconnection system does not include the air blower system). In this way, the interconnection system can receive treated air (e.g., temperature controlled and/or humidity controlled) from mobile or modular units that the interconnection system is connected to, if needed. In some cases, the interconnection system include its own air blower system/fan filter unit to receive treated air. In some cases, the air inlet and/or air outlet is configured to provide positive air pressure to the interconnection system via speed controls for the air blower system/fan filter unit. In some cases, the air inlet and/or air outlet is configured to provide negative air pressure to the interconnection system via speed controls for the air blower system/fan filter unit. In some cases, the placement of the air inlet and/or air outlet is configured to provide a unidirectional laminar flow of air within the interconnection system by positioning the air outlet at or near a ceiling of the interconnection system and the positioning the air outlet at or near a floor of the interconnection system (e.g., a low wall return).

In some cases, the air inlet and/or air outlet is fluidically coupled (e.g., via an air plenum and/or air duct) to an air blower system (i.e., the air inlet and/or air outlet is part of an air blower system). In some cases, the air blower system includes a housing and a blower motor mounted within the housing. During operation, the blower motor can generate an air flow from the air inlet, through the housing, and out of the air outlet. In some cases, the blower motor (or an air inlet coupled to an existing air plenum/blower motor of a mobile or modular unit) provides a laminar flow of air within the interconnection system. In some cases, the air blower system further includes an air conditioner and/or air heater to control of the climate within the interconnection system. In some cases, the air blower system further includes one or more air filters (e.g., a HEPA filter) mounted within the housing for removing unwanted particles from the air. In some cases, the air inlet and/or air outlet is coupled to a fan filter unit that includes an air filter. In some cases, the fan filter unit is positioned at or near a ceiling of the interconnection system. In some cases, the air inlet is positioned at or near a ceiling of the interconnection system and the air outlet is positioned at or near a floor of the interconnection system (e.g., a low wall return). In some cases, the air blower system/fan filter unit is configured to provide positive air pressure to the interconnection system via speed controls for the air blower system/fan filter unit. In some cases, the air blower system/fan filter unit is configured to provide negative air pressure to the interconnection system via speed controls for the air blower system/fan filter unit In any case, the inclusion of an air inlet and/or air inlet within the interconnection system provides the ability to supply positive or negative pressure (depending upon the requirements of the mobile and/or modular laboratories the interconnection system is connected to) to the room/space within the interconnection system. For example, the room/space within the interconnection system may be adjustable to match one (or both) of the environments of the mobile and/or modular laboratories that the interconnection system is connected to (e.g., ISO 7 Cleanroom Standard). In some cases, an interconnection system acts as a buffer for the environments in the two mobile and/or modular laboratories connected to that interconnection system.

In some cases, a gasket is made of silicone, expanded silicone, EPDM, Rubber, Viton, and/or Teflon. In some cases, an inside portion of the walkway (e.g., walkway 302 of FIGS. 3A-3C) is made of 6061 aluminum, 5052 aluminum, 3003 aluminum, 300 series stainless steel, powder coated steel, and/or powder coated aluminum. In some cases, windows/viewing panels are included within the walkway that are made of acrylic, polycarbonate, and/or glass. In some cases, the windows/viewing panels include an airtight seal that includes a gasket and/or silicone seal.

In some cases, leveling jacks are placed underneath each corner of the interconnection system for adjusting a height of one or more portions of the interconnection system (e.g., a corner and/or side). In some cases, the leveling jacks are electric. In some cases, the leveling jacks are manual. In any case, the leveling jacks provide the ability to accommodate for misalignment between two mobile and/or modular laboratories as well as support the interconnection system between two mobile and/or modular laboratories, regardless of the surrounding terrain. In some cases, the leveling jacks are used to merely adjust the height of one or more portions of the interconnection system and are removed once that adjustment is finished: and in some of these cases, alignment plates are be added for permanent support the interconnection system. In some cases, the leveling jacks are left as permanent support after adjusting the height of one or more portions of the mobile and/or modular interconnection system.

Figure 6:
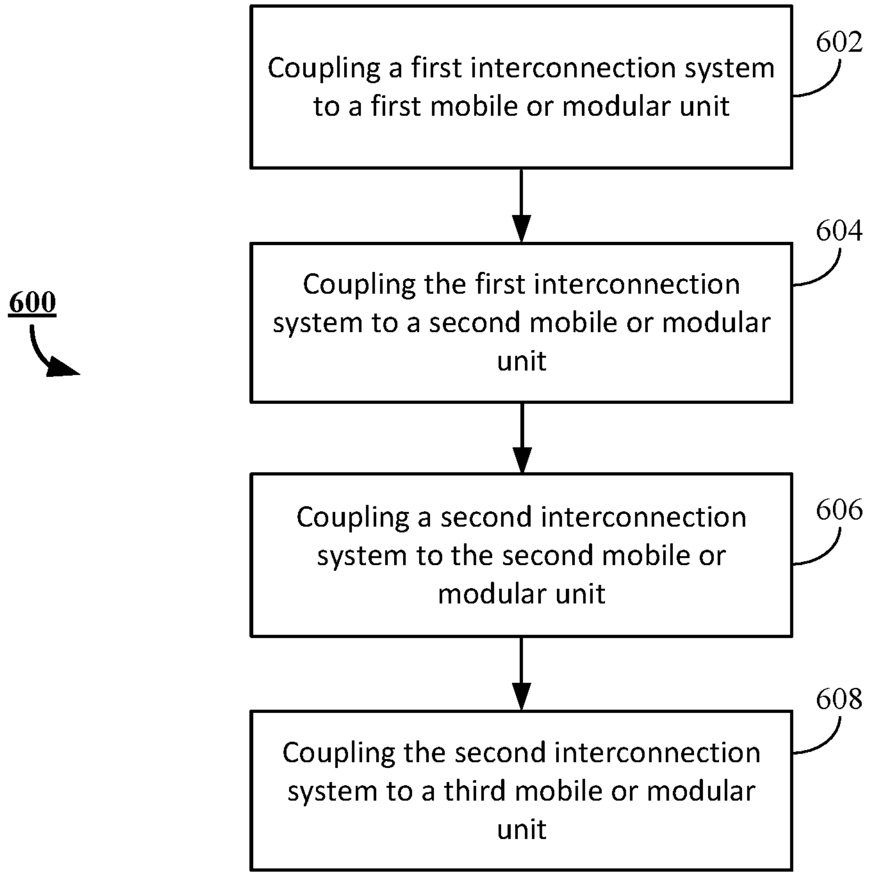
FIG. 6 illustrates a method of attaching a plurality of mobile of modular units to one or more interconnection systems.

FIG. 6 illustrates a method of attaching a plurality of mobile of modular units to one or more interconnection systems. The method 600 includes coupling (602) a first interconnection system to a first mobile or modular unit and coupling (604) the first interconnection system to a second mobile or modular unit. In some cases, coupling (602) the first interconnection system to the first mobile or modular unit includes coupling the first connection seal of the first interconnection system to a door frame of the first mobile or modular unit. In some cases, coupling (604) the first interconnection system to the second mobile or modular unit includes coupling the second connection seal of the first interconnection system to a door frame of the second mobile or modular unit. In some cases, the method 600 further includes coupling (606) a second interconnection system to the second mobile or modular unit and coupling (608) the second interconnection system to the third mobile or modular unit.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. An interconnection system for providing a sealed walkway between laboratories or cleanrooms, comprising:
- a first connection seal configured to couple to a first mobile or modular unit, wherein the first connection seal comprises:
  - a first channel for coupling to the first mobile or modular unit; and
  - a first gasket positioned within the first channel;
- a second connection seal configured to couple to a second mobile or modular unit, wherein the second connection seal comprises:
  - a second channel for coupling to the second mobile or modular unit; and
  - a second gasket positioned within the second channel; and
- a connection bridge comprising:
  - a first end configured to couple to the first gasket of the first connection seal; and
  - a second end configured to couple to the second gasket of the second connection seal,
- wherein the first and second connection seals and the connection bridge provide an airtight connection between the first mobile or modular unit and the second mobile or modular unit.

2. The interconnection system of claim 1, wherein the first gasket comprises:
- a first stationary end positioned within the first channel and a first expandable end that is expandable to make contact with a second expandable end of a second gasket of the second connection seal to provide the airtight connection between the first mobile or modular unit and the second mobile or modular unit.

3. The interconnection system of claim 2, wherein the second gasket comprises:
- a second stationary end positioned within the second channel and the second expandable end that is expandable to make contact with the first expandable end of the first gasket of the first connection seal to provide the airtight connection between first mobile or modular unit and the second mobile or modular unit.

4. The interconnection system of claim 3, wherein the first channel and the second channel is a U-channel or a C-channel.

5. The interconnection system of claim 1, wherein the first channel and the second channel is a J-channel.

6. The interconnection system of claim 1, further comprising an air blower system.

7. The interconnection system of claim 6, wherein the air blower system comprises:
- an air inlet formed within a wall, a ceiling, or a floor of the interconnection system;
- a housing fluidically coupled to the air inlet;
- an air outlet formed within the wall, the ceiling, or the floor of the interconnection system and fluidically coupled to the housing; and
- a blower motor mounted within the housing, wherein when the blower motor is in operation, the blower motor generates an air flow from the air inlet, through the housing, and out of the air outlet.

8. The interconnection system of claim 7, wherein the air blower system further comprises an air filter mounted within the housing.

9. The interconnection system of claim 6, wherein the air blower system is configured to provide a unidirectional laminar flow of air within the interconnection system.

10. The interconnection system of claim 6, wherein the air blower system is configured to provide positive air pressure to the interconnection system.

11. The interconnection system of claim 6, wherein the air blower system is configured to provide negative air pressure to the interconnection system.

12. The interconnection system of claim 1, further comprising an air inlet configured to supply treated air from the first mobile or modular unit or the second mobile or modular unit and an air outlet configured to remove air from the interconnection system.

13. The interconnection system of claim 12, wherein the air inlet and the air outlet are configured to provide positive air pressure to the interconnection system and a unidirectional laminar flow of air within the interconnection system.

14. The interconnection system of claim 12, wherein the air inlet and the air outlet are configured to provide negative air pressure to the interconnection system.

15. The interconnection system of claim 14, wherein the air inlet and the air outlet are configured to provide a unidirectional laminar flow of air within the interconnection system.

16. The interconnection system of claim 1, further comprising one or more leveling jacks underneath one or more portions of the interconnection system for adjusting a height of the one or more portions of the interconnection system.

17. A method of connecting a plurality of mobile or modular units, comprising:

coupling a first interconnection system to a first mobile or modular unit, the first interconnection system comprising:

a first connection seal configured to couple to the first mobile or modular unit, the first connection seal comprising:

a first channel for coupling to the first mobile or modular unit; and a first gasket positioned within the first connection seal;

a second connection seal configured to couple to a second mobile or modular unit, the second connection seal comprising:

a second channel for coupling to the second mobile or modular unit; and a second gasket positioned within the second channel; and a connection bridge comprising:

a first end configured to couple to the first gasket of the first connection seal; and a second end configured to couple to the second gasket of the second connection seal;

wherein the first and second connection seals and the connection bridge provide an airtight connection between the first mobile or modular unit and the second mobile or modular unit; and coupling the first interconnection system to the second mobile or modular unit.

18. The method of claim 17, wherein coupling the first interconnection system to the first mobile or modular unit comprises coupling the first connection seal of the first interconnection system to a door frame of the first mobile or modular unit.

19. The method of claim 18, wherein coupling the first interconnection system to the second mobile or modular unit comprises coupling the second connection seal of the first interconnection system to a door frame of the second mobile or modular unit.

20. The method of claim 18, further comprising:

coupling a second interconnection system to the second mobile or modular unit, the second interconnection system comprising:

a third connection seal configured to couple to the second mobile or modular unit; and a fourth connection seal configured to couple to a third mobile or modular unit, wherein the third and fourth connection seals provide an airtight connection between the second mobile or modular unit and the third mobile or modular unit; and coupling the second interconnection system to the third mobile or modular unit.

* * * * *